United States Patent Office 2,784,494
Patented Mar. 12, 1957

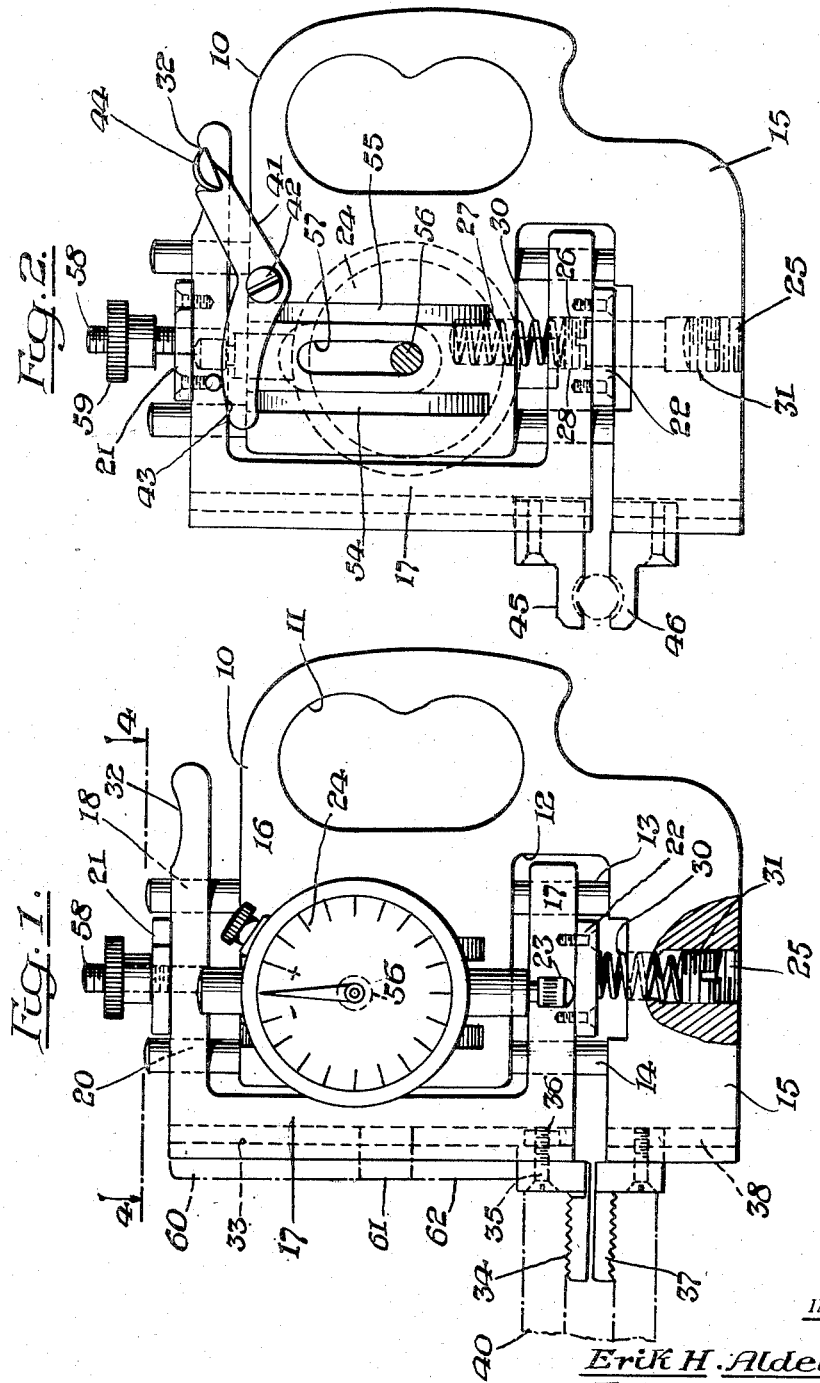

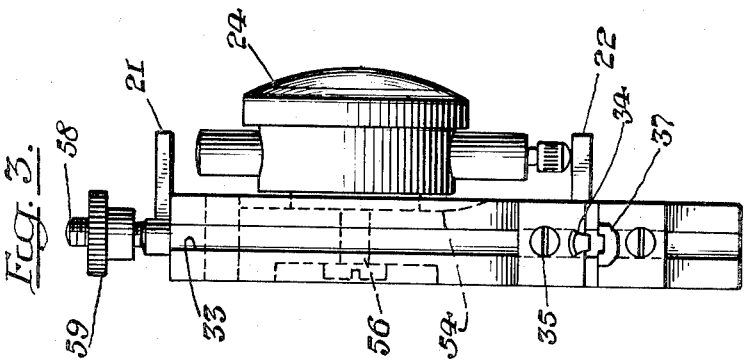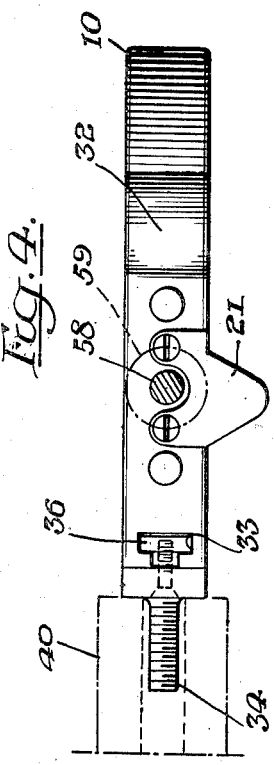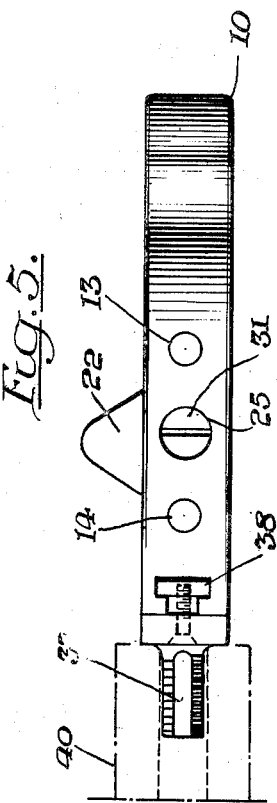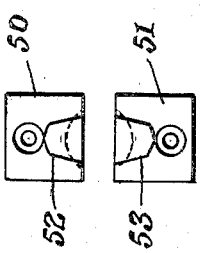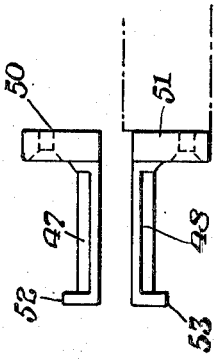

2,784,494

INSIDE AND OUTSIDE THREAD GAGE

Erik H. Aldeborgh and Frank H. Czaplinski, Poughkeepsie, N. Y., assignors to Standard Gage Company, Inc., Poughkeepsie, N. Y., a corporation of New York Application April 7, 1954, Serial No. 421,492

6 Claims. (Cl. 33—147)

The present invention relates to a gage and particularly to a gage for comparing a threaded piece with a standard. The device of the present invention is arranged so that both internal and external threads may be gaged and additionally the gage may be used for determining the correctness of a groove in a bore.

In the past thread gages have been manufactured, but these gages were so arranged that separate gages were necessary to gage internal and external threads. The gage of the present invention is readily adapted to gage either external or internal threads and is additionally so constructed as to make the change from one type of gaging to the other extremely easy and performed with the aid of the usual hand tools only.

Additionally the gage of the instant invention is so arranged that the gaging elements are urged to gaging position under a spring pressure which is constant, the spring pressure being substantially the same whether the piece gaged is internally or externally threaded. The gage is also light and readily placed in gaging position and is adapted to be placed on a stand and utilized as a comparator.

It is an object of the invention to provide a thread gage which, by minor adjustments, may be adapted to the gaging of either internal or external threads.

It is another object of the invention to provide such a thread gage wherein the movement of the gaging elements toward and away from each other is a reciprocatory movement perpendicular to the axis of the gaging elements.

It is still another object of the invention to provide such a thread gage wherein the gage is urged to gaging position by spring pressure which spring pressure is substantially the same whether the piece being gaged is provided with internal or external threads.

It is a still further object of the invention to provide such a thread gage having a dial indicator as a portion thereof, the indicator being readily mounted upon the gage and readily adjusted to operate in performing either external or internal gaging.

It is a still further object of the invention to provide a thread or groove gage which is light in weight, smooth in action, durable and inexpensive.

Other objects and features of the invention will be apparent when the following description is considered in connection with the annexed drawings, in which, Figure 1 is a front elevation of the gage of our invention showing particularly the arrangement of the dial indicator and the spring when the gage is to be used for gaging internal threads;

Figure 2 is a similar front elevation with the dial indicator shown in dot and dash lines in order to more clearly illustrate the mode of fastening the dial indicator to the gage. This view shows the gage when arranged for use as a gage for external threads;

Figure 3 is a side elevation of the gage of Figure 1;

Figure 4 is a horizontal cross-section of the gage of Figure 1, the section being taken on the plane of the line 4—4 of Figure 1;

Figure 5 is a bottom plan view of the gage of Figure 1;

Figure 6 is a side elevation of a pair of gaging jaws used for groove gaging; and Figure 7 is a front elevation of the jaws of Figure 6.

Referring now to the drawings and particularly to Figures 1 and 3, the gage comprises a relatively stationary block-like frame member 10 which is supplied with the hand-hold 11 and is adapted to be held in the hand while the gaging operation is performed. Member 10 is generally rectangular in shape and provided with a slot 12. Two guide rods 13 and 14 are supported in the lower extension 15 of the member 10 as well as in the upper extension 16 of that member. The guide rods 13 and 14 extend across the slot 12 and extend beyond the upper edge of the member 10, these rods being accurately positioned so that they are parallel to one another. Slidably mounted upon the guide rods 13 and 14 is a relatively movable gaging frame member 17 this member being generally U-shaped and provided with bores 18 and 20 in each of its arms, these bores being close sliding fits on the guide rods 13 and 14 respectively.

Mounted on the upper arm of the frame member 17 is an anvil 21 which anvil is generally triangular in shape and extends forwardly being clearly shown in Figure 4. A similar anvil 22 is mounted on the lower arm of the U-shaped frame member 17. Anvils 21 and 22 are adapted to cooperate with the measuring plunger 23 of a dial indicator 24 which dial indicator is mounted upon the central portion of the gaging frame 10. As shown in Figure 1, the dial indicator is mounted with its measuring plunger extending downwardly and cooperating with the lower anvil 22. When the dial indicator is in this position the gage is adapted to the measurement of internal threads as will be hereinafter described.

A threaded bore 25 is provided in the lower arm 15 of the frame member 10. Aligned with the bore 25 is a similar threaded bore 26 in the lower arm of the U-shaped member 17 and aligned with this bore is a third unthreaded bore 27 in the central portion of the gage frame 10. When the gage is utilized for gaging internal threads a screw 28 (see Figure 2) is threaded into the bore 26. A spring 30 is then placed in the bore 25 and a second screw 31 threaded into the bore 25 beneath the spring 30. Thus the spring 30 urges the U-shaped member 17 upwardly, that is, into gaging position for internal gaging. The upper arm of the U-shaped member 17 is provided with a finger grip 32 by means of which the frame may be moved downwardly against the pressure of the spring 30.

The face of the U-shaped member 17 is provided with a T-shaped groove 33 therein extending vertically for the entire length of this face, the groove being particularly shown in Figure 4. Adjustably fixed on the face of the member 17 is one of a pair of conventional internal thread gaging jaws 34, the jaw 34 being held in position by means of a screw 35 which passes through the base portion of the jaw, through the stem of the T-shaped notch and is threaded into a small block 36 which rests in the head of the T-shaped notch or guideway 33, the screw 35 thus clamping the gaging jaw 34 to the face of the member 17.

In a similar manner, the second jaw 37 of the pair of gaging jaws is fastened in a T-shaped guideway 38 provided in the face of the portion 15 of the frame 10.

As will be readily seen, the member 17 may be lowered so that the jaws 34 and 37 take their collapsed position after which they may be inserted in an internally threaded piece and released. They will then be urged by spring 30 into engagement with the threads of the piece being gaged which is indicated in dot and dash lines at 40 in Figure 1. As the gaging jaws 34 and 37 move into engagement the lower anvil 22 will be in engagement with the gaging plunger 23 to cause the dial indicator to indicate the deviation of the thread from a standard to which the gage has previously been set in the usual manner.

Mounted on the upper portion of the frame 10 is a bell crank lever 41, this lever being pivoted on the screw 42 and provided at its left-hand end with a camming surface 43. This camming surface cooperates with a pin extending forwardly from the upper arm of the frame member 17. At its opposite end the lever 41 terminates in a finger piece 44 so that by depressing the finger piece 44 the frame member 17 is moved upwardly. This arrangement is provided in order to utilize the gage for gaging external threads and when this mode of operation is desired the spring 30 is first inserted in the bore 27 after which the screw 28 is inserted in the bore 26. With this arrangement the spring 30 urges the frame member 17 downwardly and thus external threading jaws designated 45 and 46 are urged together, that is, into engagement with an externally threaded piece to be gaged. Also, as is clearly indicated in Figure 2, when the gage is to be used for externally threaded pieces the indicator 24 is reversed so that the measuring plunger thereof makes contact with the upper anvil 21. Thus when gaging an externally threaded piece, the jaws 45 and 46 are moved apart by pressure upon the finger piece 44 against the action of the spring 30, and as the finger piece 44 is released the jaws are caused to close upon the piece being gaged under drive of the spring 30 only. Furthermore, such movement causes the anvil 21 to bear against the gaging plunger 23 to thus indicate on the dial indicator 24 the deviation between the threads of the piece then being gaged and a standard to which the indicator was previously set.

From what has gone before it will be clear that the gage is readily converted from use as an internal thread gage to use as an external thread gage such conversion requiring only the rotation of the indicator 24 through 180°, the substitution of proper gaging jaws, and the relocation of the spring 30 so that its force is exerted in the proper direction to provide the gaging pressure.

As will be obvious, the jaws 45 and 46 utilized for external gaging are supported on the members 15 and 17 by means of the same clamping arrangement which was described in considerable detail in connection with the internal gaging jaws 34 and 37.

The gage heretofore described may also be used for other gaging operations, such for example as the gaging of circumferentially grooved bores. Thus in Figures 6 and 7 there are shown a pair of gaging jaws 47 and 48 which are provided with bases 50 and 51 respectively substantially identical to the bases of the internal thread gage jaws 34 and 37 previously mentioned. These jaws 47 and 48 are provided with usual projections 52 and 53 adapted to enter a circumferential groove at diametrically opposite pointst thereon and thus provide a reading on the dial indicator 24 indicating whether the groove is within tolerance limits previously set.

As indicated in the drawings, the central portion of the frame member 10 is provided with grooves 54 and 55 in which ribs formed on the back of the dial indicator seat, the indicator being held in its adjusted position by means of a screw 56 which extends through a slot 57 in the member 10 and threads into a tapped hole in the back of the indicator 24. This means of fastening the indicator in place is one of many which may be utilized and it is in general unnecessary that the grooves 54 and 55 be provided since the gage may be clamped sufficiently tightly to the face of the frame member 10 to assure that there will be no movement from its adjusted position.

In order to limit the movement of the frame member 17 a threaded rod 58 extends upwardly from the frame member 10 through a bore in the member 17 and is provided with a knurled nut 59 which may be adjustably positioned on the rod 58 and thus limit the movement of the frame 17 upwardly as seen in Figures 1 and 2. By means of this limiting, assurance is given that the movement of the frame member 17 will not be such as to operate the dial indicator beyond the distance required for gaging.

It will be understood that when the gage is arranged as shown in Figure 2 for external thread gaging, the screw 31 is not utilized, but is merely threaded into the bore 25 in order to store the screw and have it available for use when the gage is converted for operation as an internal thread gage.

Since the members 10 and 17 may be formed of relatively soft material such for example as magnesium or aluminum and since the faces of these members are necessarily exposed when the smaller sizes of thread gaging jaws such as 34 and 37 are utilized, we have provided means for protecting the face of the member 17, which has the greatest area exposed. This means comprises three sections of plastic material which are adapted to slide into the T-shaped slot or guideway 33 and to extend over the face of the member 17, the sections being designated respectively from top to bottom 60, 61 and 62. By providing three members of different lengths it is possible to protect substantially the entire face of the member 17 by utilizing one, two or three of these members, thus filling that portion of the slot 33 not taken up by the base porion of the thread gaging jaw 34. These protecting members may be made, for example, of a plastic material, rubber or other suitable material and it will be understood that if the gage frame members 10 and 17 are of a relatively hard material then the use of the members 60 through 62 will serve to protect elements associated with the threaded member being gaged.

While we have described preferred embodiments of our invention, it will be understood that many other modifications may be made without departing from the spirit and scope of our invention. We wish therefore to be limited not by the foregoing description but, on the contrary, solely by the claims granted to us.

What is claimed is:

1. In a thread gage or the like, in combination, a relatively stationary frame member, a relatively movable frame member, means mounting said movable frame member on said stationary member for reciprocatory movement with respect thereto, spring means urging said movable frame member in a selected direction, a pair of thread gaging elements mounted one on each said frame member in cooperating relationship, a dial indicator adapted to be mounted on said stationary frame member in a selected one of two positions and extensions on said movable frame member for operating said dial indicator, said extensions being selected for use by positioning said dial indicator in the selected one of said two positions, the direction of urge by said spring means being coordinated with said dial indicator position to cause the gaging jaws to be moved to gaging position by said spring means, said dial indicator being then operated by a selected one of said extensions.

2. A thread gage for gaging both internal and external threads, comprising, in combination, a relatively stationary frame member, a pair of thread gaging elements, means mounting one of said pair of thread gaging elements on said stationary frame member, a relatively movable frame member, means mounting said movable frame member on said stationary frame member for reciprocatory movement with respect thereto, means mounting the second of said pair of thread gaging elements on said movable frame member in position to cooperate with the first element of said pair, a spring, a pair of mounting means for said spring, one of said mounting means causing said spring to urge said movable frame member in one direction with respect to said stationary frame member and the other of said mounting means causing said spring to urge said movable frame member in the opposite direction with respect to said stationary frame member, a dial indicator, means mounting said dial indicator on said stationary frame in either of two positions, a pair of projections extending from said movable frame member, each of said projections being adapted to cooperate with said dial indicator in one of said two positions, and a pair of manually operable means, one for urging said movable frame member in each direction with respect to said stationary frame member whereby said movable frame member may be urged in gaging direction by said spring and in the opposite direction by one of said manually operated means.

3. A thread gage for gaging both internally and externally threaded pieces comprising, in combination, a relatively stationary frame member, said stationary frame member being generally rectangular, a relatively movable frame member, said relatively movable frame member being generally U-shaped and having the arms thereof lying adjacent opposite edges of said stationary frame member, guide means mounted in said stationary frame member for guiding said movable frame member for reciprocatory movement relative to said stationary frame member, a pair of thread gaging elements mounted in cooperating position, one on said stationary frame member and one on said movable frame member, said movable frame member and said stationary frame member having aligned bores therein, a spring mounted in said bores, said spring urging said movable frame member in a selected direction with respect to said stationary frame member, a dial indicator having a measuring plunger, means for adjustably mounting said dial indicator on said stationary frame member, and means comprising projections extending from the arms of said movable frame member to engage the measuring plunger of said indicator to indicate thereon the relative movement of said frame members as said gaging elements are moved therewith.

4. A thread gage for gaging both internally and externally threaded pieces comprising, in combination, a relatively stationary frame member, said frame member being generally rectangular in shape, a relatively movable frame member, said frame member being generally U-shaped and having the arms thereof lying adjacent opposite edges of said rectangular stationary frame member, guide rods fixed in said opposite edges of said stationary frame member, said arms of said movable frame member having guide bores therein, said bores cooperating with said guide rods to guide said movable frame member for reciprocatory movement parallel to the base of said U-shaped member with respect to said stationary frame member, means mounting one of a pair of thread gaging elements on said movable frame member, means mounting the second of a pair of thread gaging elements on said stationary frame member, said second gaging element being cooperatively positioned with respect to said first gaging element, spring means extending between said movable and said stationary frame members, said spring means urging said movable member in either direction with respect to said stationary frame member, means mounting said spring means to select the direction of movement of said movable frame member under urge thereof, a projection fixed to each arm of said movable frame member, a dial indicator having a measuring plunger, and means for mounting said dial indicator on said stationary frame member with said plunger in engagement with a selected one of said movable frame projections.

5. A thread gage for gaging both internally and externally threaded pieces comprising, in combination, a relatively stationary frame member, said frame member being generally rectangular in shape, a relatively movable frame member, said movable frame member being generally U-shaped and having the arms thereof lying adjacent opposite edges of said rectangular stationary frame member, guide rods fixed in said opposite edges of said stationary frame member, said arms of said movable frame member having guide bores therein, said bores cooperating with said guide rods to guide said movable frame member for reciprocatory movement with respect to said stationary frame member, means mounting one of a pair of thread gaging elements on said U-shaped movable frame member, means mounting the second of a pair of thread gaging elements on said stationary frame member, said second gaging element being cooperatively positioned with respect to said first gaging element, spring means extending between said movable and said stationary frame members, said spring means urging said movable member in either direction with respect to said stationary frame member, means mounting said spring means to select the direction of movement of said movable frame member under urge thereof, a projection fixed to each arm of said movable frame member, a dial indicator having a measuring plunger, means for mounting said dial indicator on said stationary frame member with said plunger in engagement with a selected one of said movable frame projections, and manually operable means for urging said frame member in either direction relative to said stationary member.

6. A thread gage or the like comprising, in combination, a relatively stationary frame member of generally rectangular shape, a movable frame member, said movable frame member being generally U-shaped and having the arms thereof lying adjacent the opposite edges of said rectangular stationary frame member, means mounting said movable frame member on said stationary frame member for reciprocatory movement with respect thereto, a projection on said stationary frame member, said projection extending parallel to one of the arms of said U-shaped frame member and in alignment therewith the base portion of said U-shaped movable frame member having a slot therein, said slot being T-shaped, the aligned face of said projection having a similar T-shaped slot therein, a pair of thread gaging elements, means clamping one of said gaging elements on the face of said movable frame member, and means clamping the other of said elements on the face of said projection, said clamping means comprising clamping blocks placed in said slots and screws extending through said elements clamping said gaging elements against the faces of said movable and stationary frame members.

References Cited in the file of this patent

UNITED STATES PATENTS

| | | |
|---|---|---|
| 2,197,198 | Street | Apr. 16, 1940 |
| 2,448,106 | Mannerbrink et al. | Aug. 31, 1948 |

FOREIGN PATENTS

| | | |
|---|---|---|
| 832,500 | Germany | Feb. 25, 1952 |